United States Patent
Haas

(10) Patent No.: US 11,590,916 B2
(45) Date of Patent: Feb. 28, 2023

(54) STEERING DEVICE ASSEMBLY AND METHOD FOR INSTALLING AN AIRBAG MODULE ON A STEERING DEVICE OF A MOTOR VEHICLE

(71) Applicant: ZF Automotive Safety Germany GmbH, Aschaffenburg (DE)

(72) Inventor: Markus Haas, Oberzent (DE)

(73) Assignee: ZF Automotive Safety Germany GmbH, Ashaffenburg (DE)

( * ) Notice: Subject to any disclaimer, the term of this patent is extended or adjusted under 35 U.S.C. 154(b) by 0 days.

(21) Appl. No.: 17/295,376

(22) PCT Filed: Nov. 25, 2019

(86) PCT No.: PCT/EP2019/082413
§ 371 (c)(1),
(2) Date: May 19, 2021

(87) PCT Pub. No.: WO2020/126325
PCT Pub. Date: Jun. 25, 2020

(65) Prior Publication Data
US 2022/0001824 A1    Jan. 6, 2022

(30) Foreign Application Priority Data
Dec. 18, 2018 (DE) ................. 10 2018 132 646.7

(51) Int. Cl.
*B60R 21/203* (2006.01)
(52) U.S. Cl.
CPC ................. *B60R 21/203* (2013.01)
(58) Field of Classification Search
CPC .............. B60R 21/203; B60R 21/2035; B60R 21/2037
See application file for complete search history.

(56) References Cited

U.S. PATENT DOCUMENTS

| | | | |
|---|---|---|---|
| 5,620,201 A * | 4/1997 | Ricks | B60R 21/2035 280/732 |
| 6,572,136 B2 * | 6/2003 | Inoue | B60R 21/205 280/732 |

(Continued)

FOREIGN PATENT DOCUMENTS

| DE | 29621295 U1 | 3/1997 |
|---|---|---|
| DE | 102005056837 A1 | 4/2007 |

OTHER PUBLICATIONS

International Search Report and Written Opinion for PCT/EP2019/082413 dated Feb. 12, 2020 (11 pages; with English translation).

*Primary Examiner* — Laura Freedman
(74) *Attorney, Agent, or Firm* — Kristin L. Murphy

(57) ABSTRACT

The disclosure is directed to a steering device assembly for positioning and fastening an airbag module on a steering device of a motor vehicle. The steering device assembly comprises a first positioning body having a detent lever, a carrier, a spring element, and a second positioning body. The detent lever comprises a first leg and a second leg connected to the first leg at one leg end the detent lever is mounted for pivoting between an initial position and a final assembly position on the carrier. The spring element loads the detent lever into the final assembly position. Each leg extends to an opposite free leg end at a specified angle. The second positioning body has a stop for the free leg end of the first leg for pivoting the detent lever from the initial position into the final assembly position and a detent contour for locking with the free leg end of the second leg in the final assembly position of the detent lever. A method for installing an airbag module on a steering device of a motor vehicle by the steering device assembly.

20 Claims, 4 Drawing Sheets

(56) References Cited

U.S. PATENT DOCUMENTS

| | | | |
|---|---|---|---|
| 7,410,188 B2* | 8/2008 | Jeong | B60R 21/217 |
| | | | 280/728.2 |
| 2001/0011815 A1 | 8/2001 | Ikeda et al. | |
| 2009/0315304 A1 | 12/2009 | Hagelgans et al. | |
| 2022/0024511 A1* | 1/2022 | Haas | B60R 21/2037 |

* cited by examiner

STEERING DEVICE ASSEMBLY AND METHOD FOR INSTALLING AN AIRBAG MODULE ON A STEERING DEVICE OF A MOTOR VEHICLE

CROSS-REFERENCE TO RELATED APPLICATIONS

This application is a national stage of International Application No. PCT/EP2019/082413, filed Nov. 25, 2019, the disclosure of which is incorporated herein by reference in its entirety, and which claimed priority to German Patent Application No. 102018132646.7, filed Dec. 18, 2018, the disclosure of which is incorporated herein by reference in its entirety.

TECHNICAL FIELD

The disclosure relates to a steering device assembly for positioning and fastening an airbag module on a steering device of a motor vehicle, where the steering device can be rotated about a steering axis. In addition, the disclosure also relates to a method for installing an airbag module on a steering device of a motor vehicle.

BACKGROUND

Known conventional steering device assemblies usually comprise a rotatable steering device, in particular a steering wheel, as well as an airbag module fastened in a hub region of the steering device. Rigid detent hooks for locking with the steering device may be provided on the airbag module. The airbag module is installed, for example, by two detent mechanisms which fulfill different tasks. The rigid detent hooks lock with an elastic spring wire pre-mounted on the steering device (first detent mechanism) and, moreover, engage in foam pockets of the steering device with which they equally lock (second detent mechanism). The first detent mechanism safeguards, after activation of the airbag module, that the airbag module will not detach from the steering device even if high forces occur, but remains reliably connected to the steering device. During a normal driving operation, i.e., prior to activation of the airbag module, the elastic spring wire may be spaced apart from the rigid detent hooks. The exact positioning of the airbag module is then guaranteed by the second detent mechanism.

With regard to the second detent mechanism, usually an expensive subsequent calibration of the airbag modules is required so that, during normal driving operation, high requirements made to gap width between the airbag module and the steering device can be met. However, due to long tolerance chains and manufacturing tolerances, especially of the foam pockets, it is difficult to achieve not only an exact positioning of the airbag module, but also the precise adjustment of a desired detent force. Therefore, an assembler may have to apply an undesirably high force for closing or releasing the second detent mechanism during assembly/disassembly of the airbag module.

What is needed is a steering device assembly in which an exact fine positioning of the airbag module relative to the steering device can be realized and a detent force reproducible within very narrow limits can be adjusted with little effort.

SUMMARY

In accordance with the disclosure, an arrangement of a steering device assembly for positioning and fastening an airbag module on a steering device of a motor vehicle which is rotatable about a steering axis is disclosed. The steering device assembly comprises a first positioning body which has a detent lever including a first leg and a second leg connected to the first leg, a carrier on which the detent lever is mounted for pivoting between an initial position and a final assembly position, and a spring element for loading the detent lever into the final assembly position. The legs of the detent lever are connected to each other at one leg end and each extends to an opposite free leg end at a specified angle. The steering device assembly further comprises a second positioning body which has a stop for the free leg end of the first leg for pivoting the detent lever from the initial position into the final assembly position and a detent contour for locking with the free leg end of the second leg in the final assembly position of the detent lever.

The fine alignment and the detent force adjustment between the first and second positioning bodies, and in one exemplary arrangement, between the airbag module and the steering device of the steering device assembly, now is no longer dependent on the geometry and compressibility of foam pockets subject to high tolerances in the steering device, but on a spring-loaded detent lever which can be adjusted significantly more precisely regarding the fine alignment and the detent force with little effort.

With respect to a steering axis, in the final assembly position of the detent lever, the second leg can extend substantially in a radial direction. This results in particularly stable positioning of the airbag module relative to the steering device, as the second leg transfers forces occurring with an external excitation transversely to the steering axis, without a torque acting on the detent lever. In the initial position of the detent lever, the first leg may extend substantially in the radial direction. In this way, the detent lever can have a compact design and, during assembly of the airbag module, can be pivoted with minimum expenditure of energy.

In accordance with one exemplary arrangement of the steering device assembly, a pivoting movement of about 90° lies between the initial position and the final assembly position of the detent lever. The advantageous constellation of the second leg extending, in the final assembly position of the detent lever, in the radial direction and the first leg extending, in the initial position of the detent lever, in the radial direction can be realized with a pivoting movement of 90°.

In one exemplary arrangement, the spring element is a leaf spring attached to the carrier. This arrangement is advantageous because leaf springs require minimum space only and, moreover, can be easily manufactured at low cost.

More specifically, the spring element can load the detent lever depending on the pivoting position thereof into the initial position or the final assembly position, whichever is closer. In this case, the spring element assists the final phase of each of the assembly and disassembly operation of an airbag module so that an assembler will be relieved both during assembly and during disassembly.

In accordance with another exemplary arrangement of the steering device assembly, the carrier is firmly connected to the first positioning body, and in one exemplary arrangement may be formed integrally with the first positioning body. More specifically, when the carrier is already integrally integrated during manufacture of the positioning body, a tolerance chain can be advantageously shortened, and ultimately also a gap width between the two positioning bodies can thus be minimized.

The detent contour formed on the second positioning body may be a recess, and in one exemplary arrangement, a peripheral groove extending in the peripheral direction. Such detent contour can be easily and inexpensively molded when manufacturing the second positioning body.

Furthermore, the second positioning body may include a guide groove for axially guiding the free leg end of the first leg, with the stop for pivoting the detent lever being provided at an axial end of the guide groove. Said axial assembly guide allows for easy integration of the stop for pivoting the detent lever and, in addition, may ensure a desired alignment of the two positioning bodies, i.e., of the airbag module and the steering device, in the peripheral direction.

In one exemplary arrangement, the first positioning body corresponds to the steering device and the second positioning body corresponds to the airbag module. Alternatively, other configuration variants are contemplated, however, in which the first positioning body corresponds to the airbag module and the second positioning body corresponds to the steering device.

The disclosure furthermore also comprises a method for installing an airbag module on a steering device of a motor vehicle by means of an above-described steering device assembly. More specifically one of the two positioning bodies includes a substantially rigid catch hook and the other of the two positioning bodies includes an elastic detent element for locking with the catch hook, and the disclosed method comprises the following steps:

the second positioning body is fed to the first positioning body in the axial assembly direction. In one exemplary arrangement, the second positioning body is axially guided on the first positioning body;

the free leg end of the first leg comes into contact with the stop on the second positioning body, thus causing the detent lever to pivot from its initial position into its final assembly position and to lock with the detent contour of the second positioning body in the final assembly position, wherein the elastic detent element locks with the catch hook, before the detent lever reaches its final assembly position.

BRIEF DESCRIPTION OF THE DRAWINGS

Further features and advantages of the disclosure will be evident from the following description of an exemplary arrangement with reference to the drawings, wherein.

DETAILED DESCRIPTION

FIGS. 1 to 5 illustrate an exemplary arrangement of a steering device assembly 10 for positioning and fastening an airbag module on a steering device of a motor vehicle, wherein the steering device can be rotated about a steering axis. The steering device assembly 10 comprises a first positioning body 12 and a second positioning body 14.

In the shown exemplary arrangement of the steering device assembly 10, the first positioning body 12 corresponds to the steering device and the second positioning body 14 corresponds to the airbag module. The steering device may be configured as a steering wheel, wherein the Figures schematically indicate merely cutouts of the steering wheel in a hub region.

Alternatively, it is contemplated that other configurations of the steering device assembly 10 are possible, for example in which the first positioning body 12 corresponds to the airbag module and the second positioning body 14 corresponds to the steering device.

Figure 3:
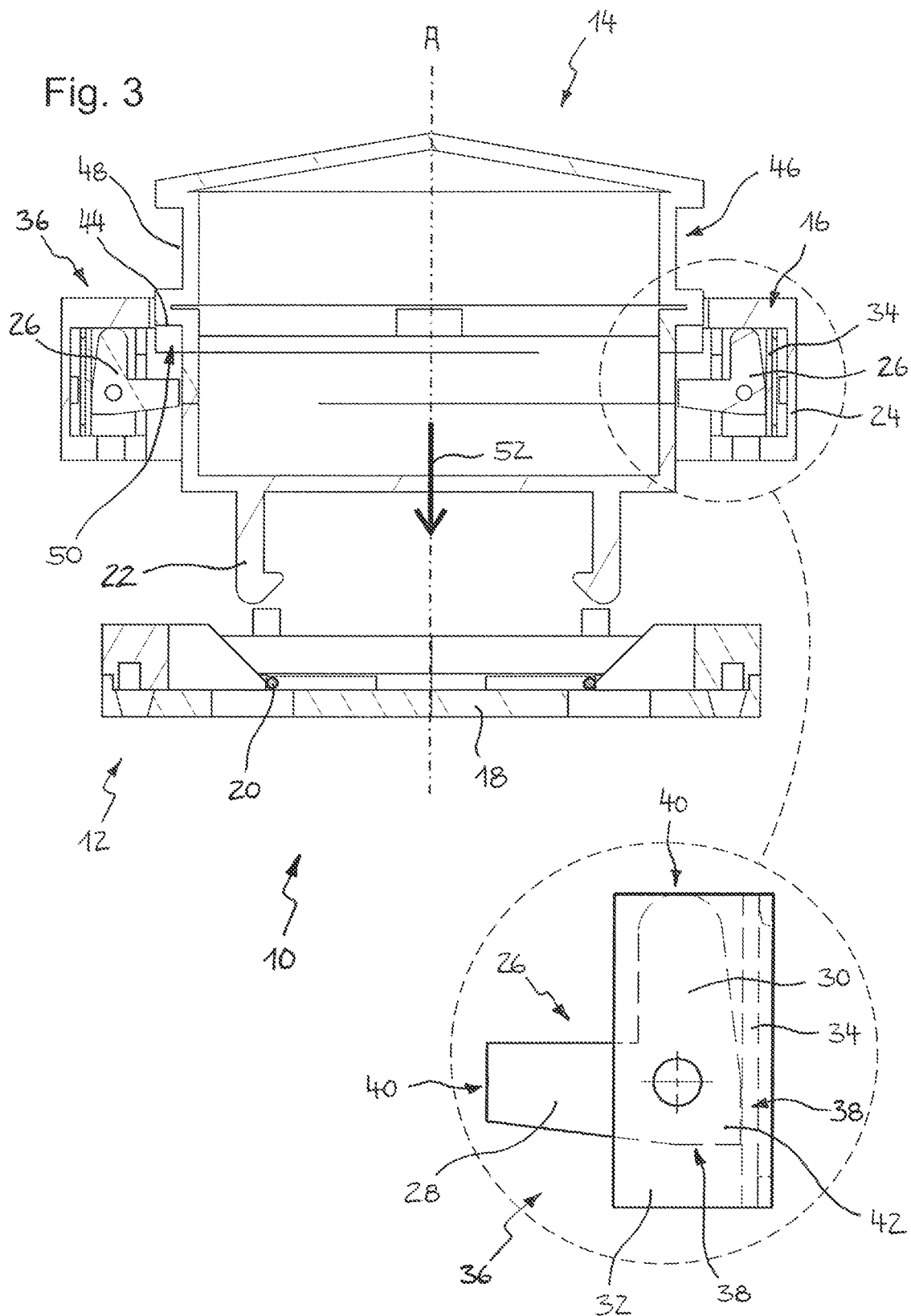
FIG. 3 shows a section across the steering device assembly according to FIG. 2 prior to being assembled.
Figure 4:
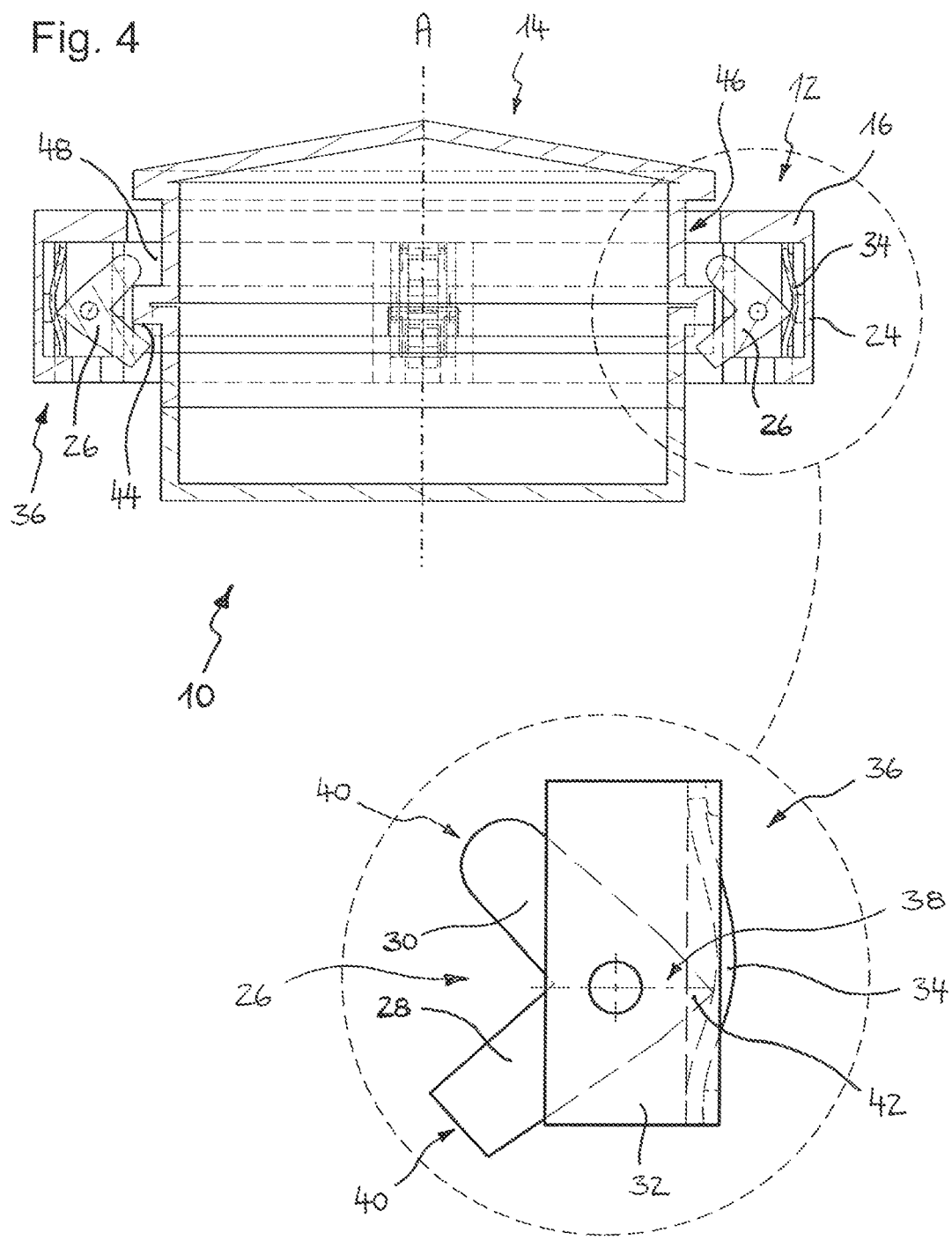
FIG. 4 shows a section across the steering device assembly according to FIG. 2 while being assembled.
Figure 5:
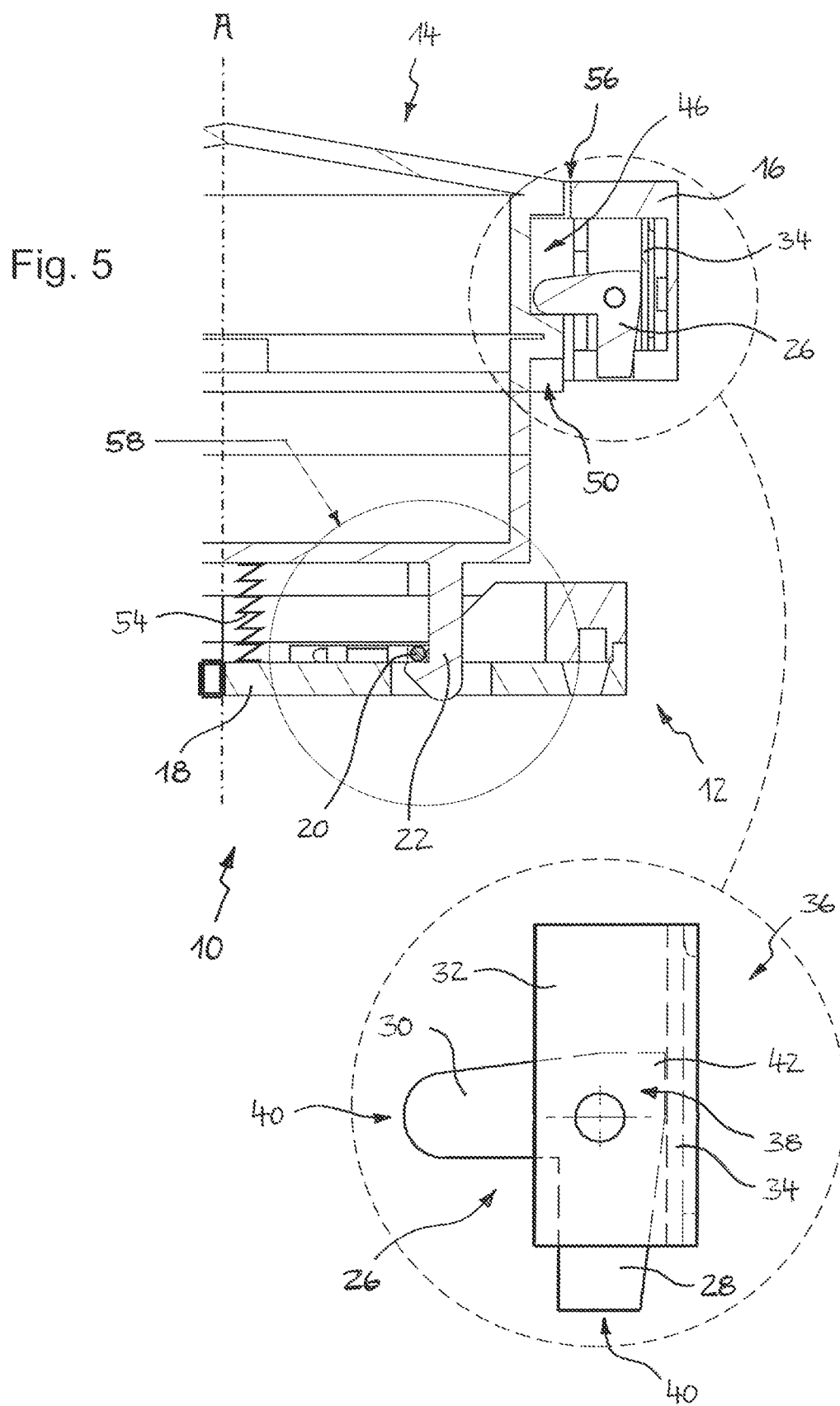
FIG. 5 shows a section across the steering device assembly according to FIG. 2 after being assembled.

In the exemplary configuration, the airbag module has a longitudinal module axis A and during assembly is moved in an axial assembly direction 52 until it locks with the steering device (cf. FIGS. 3 to 5). Disassembly of the airbag module is carried out in an opposite axial disassembly direction. The longitudinal module axis A in the present exemplary arrangement extends in parallel to the steering axis of the steering device and, in particular, can be identical with the latter.

The first positioning body 12 in the form of a steering device comprises a hider 16 which, in an assembled state of the steering device assembly 10, is at least partially visible and abuts on the second positioning body 14 in the form of an airbag module. Further, the steering device may further comprise a skeleton, for example, a steering wheel skeleton generally known from prior art having a rim portion, a spoke portion, and a hub portion. An anchoring component 18 for the airbag module schematically indicated in the Figures is a skeleton portion, especially a hub portion of a steering wheel skeleton, or an intermediate plate of the steering device firmly connected to the skeleton. An elastic detent element 20 in the form of a detent spring which forms a detent connection with a substantially rigid catch hook 22 of the airbag module during assembly of the airbag module on the steering device is pre-mounted to said anchoring component 18.

Figure 1:
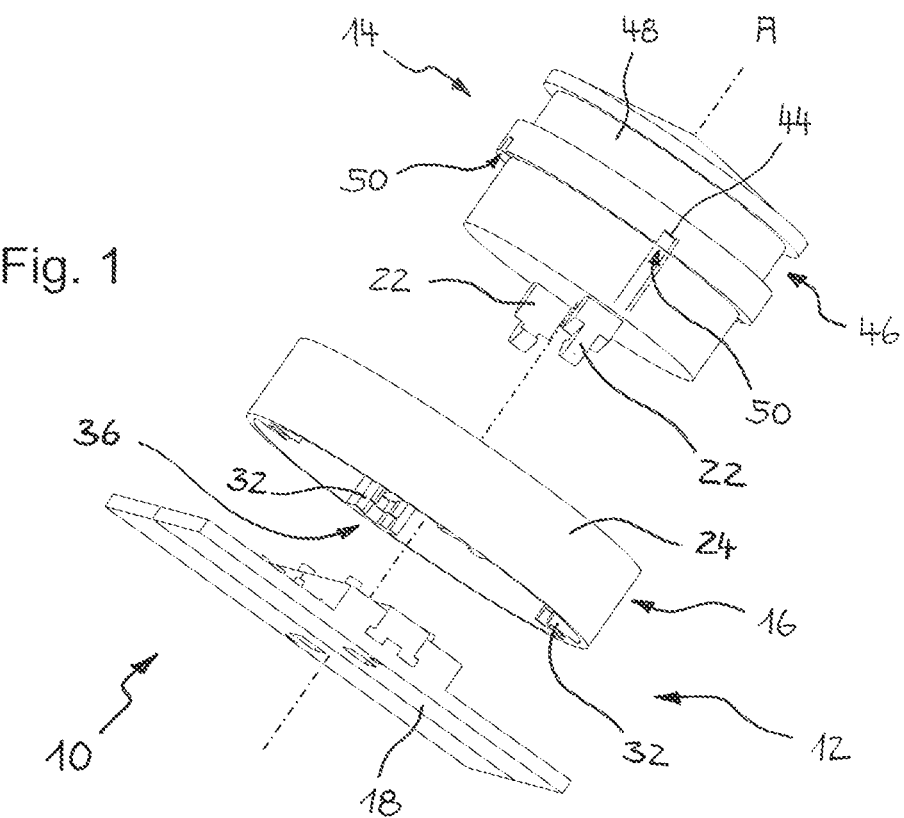
FIG. 1 shows a perspective exploded view of a steering device assembly according to an exemplary arrangement.
Figure 2:
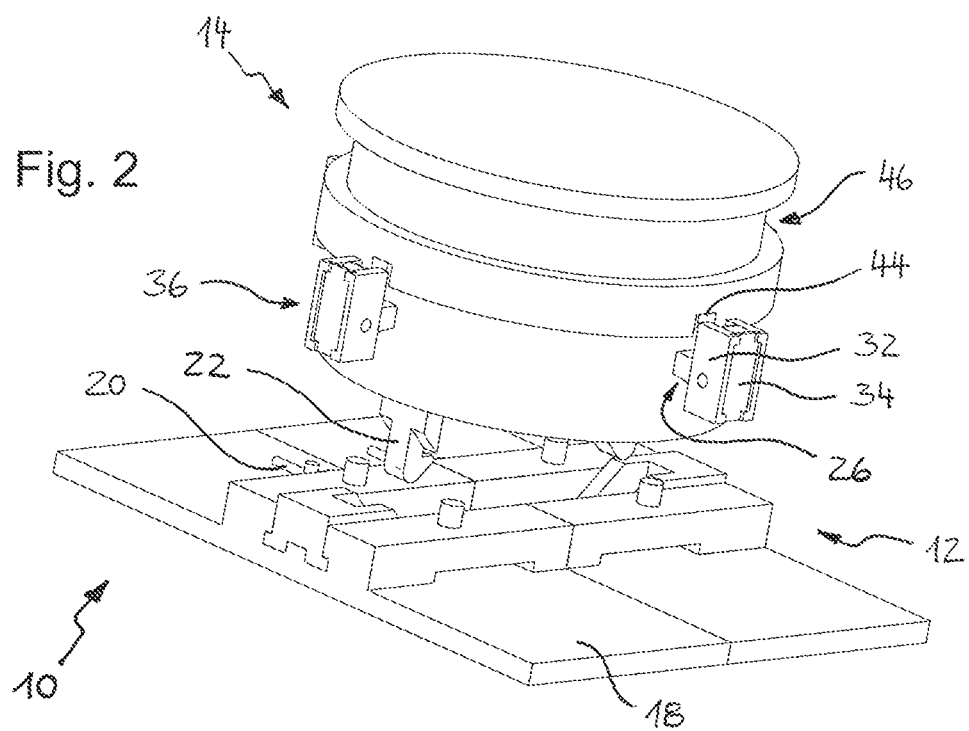
FIG. 2 shows a perspective view of the steering device assembly according to FIG. 1 prior to being assembled.

FIG. 2 illustrates the steering device assembly 10 according to FIG. 1 prior to being assembled, wherein a peripheral wall 24 of the hider 16 provided in FIG. 1 is not shown here to better identify other components of the first positioning body 12.

The first positioning body 12 comprises a detent lever 26 which includes a first leg 28 and a second leg 30 connected to the first leg 28, a carrier 32 on which the detent lever 26 is mounted for pivoting between an initial position and a final assembly position, and a spring element 34 for loading the detent lever 26 into the final assembly position.

The detent lever 26, the carrier 32 and the spring element 34 form a detent lever unit 36, the first positioning body 12 including at least three detent lever units 36. In one exemplary arrangement, four detent lever units 36 are evenly distributed in a peripheral direction are provided on an inside of the peripheral wall 24 of the hider 16.

The carrier 32 is firmly connected to the first positioning body 12, and more specifically to the hider 16 of the first positioning body 12. Further, the carrier 32 in one exemplary arrangement, is integrally integrated in the hider 16.

FIGS. 3 to 5 illustrate longitudinal sections of the steering device assembly 10, wherein FIG. 3 shows a state of the steering device assembly 10 prior to assembly, FIG. 4 shows a state of the steering device assembly 10 during assembly and FIG. 5 shows a state of the steering device assembly 10 after assembly of the second positioning body 14 on the first positioning body 12. Correspondingly, each detent lever 36 is shown in FIG. 3 is in its initial position, in an intermediate position in FIG. 4, and in a final assembly position in FIG. 5.

It becomes clear especially from the detailed cutouts of FIGS. 3 to 5 that the two legs 28, 30 of the detent lever 26 are connected to each other at one common leg end 38 and each extends, at a specified angle, to an opposite free leg end 40, the two legs 28, 30 of the detent lever 26 and in one exemplary arrangement, enclosing an angle of about 90°. In the region of the interconnected leg ends 38 a pivot axis of the detent lever 26 is located via which the detent lever 26 is mounted for pivoting on the carrier 32.

With respect to the steering axis and the longitudinal module axis A, the first leg 28 extends in an initial position of the detent lever 26 (FIG. 3) and the second leg 30 extends in a final assembly position of the detent lever 26 (FIG. 5) substantially in the radial direction.

Accordingly, a pivoting movement of substantially 90° lies between the initial position and the final assembly position of the detent lever 26.

According to the exemplary arrangement shown in FIGS. 3 to 5, the spring element 34 of the detent lever unit 36 may be a leaf spring attached to the carrier 32. In the initial position of the detent lever 26 according to FIG. 3 and in the final assembly position of the detent lever 26 according to FIG. 5, said spring element 34 is largely relaxed or has only a certain residual tension. When pivoting the detent lever 26 between its initial position and its final assembly position, the spring element 34 is deformed by a detent lever projection 42 and is thus tensioned. In the present case, the spring element 34 reaches its maximum deformation approximately in the middle between the initial position and the final assembly position of the pivoting detent lever 26, as illustrated in FIG. 4.

Accordingly, the spring element 34 loads the detent lever 26 depending on the current pivot position thereof into the initial or final assembly position, whichever is closer.

The second positioning body 14 in the form of the airbag module comprises an axial stop 44 for the free leg end 40 of the first leg 28 for pivoting the detent lever 26 from the initial position to the final assembly position.

In one exemplary arrangement, the second positioning body 14 includes a guide groove 50 for axially guiding the free leg end 40 of the first leg 28, the stop 44 being provided at an axial groove end of the guide groove 50 for pivoting the detent lever 26. In one exemplary arrangement of the steering device assembly 10, an axial dimension of the guide groove 50 on an outside of the airbag module is comparatively small so that, during the assembly operation, an axial guidance is not reached until rather late. In order to realize an axial guidance early during assembly of the airbag module, the guide groove 50 in an alternative configuration extends on the outside of the airbag module axially further in the direction of the anchoring component 18, as is indicated in broken lines in FIG. 1.

The second positioning body 14 further comprises a detent contour 46 for locking with the free leg end 40 of the second leg 30 in the final assembly position of the detent lever 26. According to the exemplary arrangement of FIG. 1, this detent contour 46 is configured as a recess on an outside surface of the second positioning body 14, for example as a peripheral groove 48 extending in a peripheral direction.

As already mentioned above, one of the two positioning bodies 12, 14, and in the exemplary arrangement shown in FIGS. 1-5, the second positioning body 14 in the form of the airbag module, includes the substantially rigid catch hook 22, and the other of the two positioning bodies 12, 14, i.e., the first positioning body 12 in the form of the steering device, includes the elastic detent element 20 for locking with the catch hook 22.

Referring to FIGS. 3 to 5, hereinafter the assembly of the airbag module on the steering device of a motor vehicle utilizing the exemplary arrangement of the steering device assembly 10 shall be described.

According to FIG. 3, initially the second positioning body 14 is moved to the first positioning body 12 in the axial assembly direction 52, with the detent lever 26 being in its initial position. In so doing, the second positioning body 14 can be guided, via the guide groove 50 and the detent lever 26 engaging in the latter, in the axial direction at least in portions at the first positioning body 12.

With this axial relative movement of the two positioning bodies 12, 14, the free leg end 40 of the first leg 28 comes into contact with the stop 44 at the second positioning body 14, thus causing the detent lever 26 to be pivoted and the spring element 34 to be tensioned, as shown in FIG. 4. After overcoming a maximum deformation of the spring element 34 in an intermediate position of the detent lever 26, the second positioning body 14 is moved further in the axial assembly direction 52, until the detent lever 26, being assisted by the spring force of the spring element 34, snaps into the detent contour 46 of the second positioning body 14 in the form of a peripheral groove 48 and thus adopts its final assembly position.

However, before the detent lever 26 reaches its final assembly position, the elastic detent element 20 locks with the catch hook 22.

Thus, the fine positioning of the airbag module is effectuated relative to the steering device during normal driving operation, that is, before activation of the airbag module, by the detent connection between the detent lever 26 and the detent contour 46, while in one exemplary arrangement, the elastic detent element 20 is slightly spaced apart from the catch hook 22 in the axial direction.

A detent connection 58 between the elastic detent element 20 and the catch hook 22 is mechanically loaded as late as after activation of the airbag module and then ensures that the airbag module does not detach from the steering device even if high forces are occurring, but instead remains reliably connected to the steering device.

During normal driving operation, the axial and radial positioning between the airbag module, for example, a module housing of the airbag module, and the steering device, especially a hider 16 of the steering device, is thus exclusively performed via the detent lever 26.

According to FIG. 5, a spring 54 is provided, such as a module ejection or horn spring, which loads a lower edge of the peripheral groove 48 axially against the detent lever 26 retained by the spring element 34 in the final assembly position and thus ensures precise axial alignment of the airbag module.

The radial alignment of the airbag module is performed via the detent levers 26 arranged to be distributed in the peripheral direction and is substantially only dependent on the length of the second leg 30, and more specifically on a distance of the free leg end 40 from the pivot axis of the detent lever 26.

Due to these short tolerance chains, precise axial and radial fine positioning of the airbag module relative to the steering device is possible with comparatively little effort. In this way, high requirements made to gap width can be met which provide gap widths of significantly less than 1 mm, and in one exemplary arrangement, of about 0.5 mm, for example for a gap 56 between a module cover of the airbag module and the hider 16 of the steering device.

What is claimed is:

1. A steering device assembly for positioning and fastening an airbag module on a rotatable steering device of a motor vehicle, comprising:
a first positioning body and a second positioning body, wherein the first positioning body has a detent lever including a first leg and a second leg connected to the first leg,
a carrier on which the detent lever is mounted for pivoting between an initial position and a final assembly position, and
a spring element for loading the detent lever into the final assembly position,
wherein the two legs of the detent lever are connected to each other at one leg end and each leg extends to an opposite free leg end at a specified angle,
wherein the second positioning body has a stop for the free leg end of the first leg for pivoting the detent lever from the initial position into the final assembly position and a detent contour for locking with the free leg end of the second leg in the final assembly position of the detent lever.

2. The steering device assembly according to claim 1, wherein in the final assembly position of the detent lever, the second leg extends substantially in a radial direction.

3. The steering device assembly according to claim 2, wherein in the initial position of the detent lever, the first leg extends substantially in the radial direction.

4. The steering device assembly according to claim 1, wherein a pivoting movement of substantially 90° lies between the initial position and the final assembly position of the detent lever.

5. The steering device assembly according to claim 1, wherein the spring element is a leaf spring attached to the carrier.

6. The steering device assembly according to claim 1, wherein the carrier is firmly connected to the first positioning body.

7. The steering device assembly according to claim 6, wherein the carrier is integrally formed with the first positioning body.

8. The steering device assembly according to claim 1, wherein the detent contour formed on the second positioning body is a peripheral groove extending in a peripheral direction.

9. The steering device assembly according to claim 1, wherein the second positioning body includes a guide groove for axially guiding the free leg end of the first leg, the stop being provided for pivoting the detent lever at an axial groove end of the guide groove.

10. The steering device assembly according to claim 1 wherein the first positioning body corresponds to the steering device and the second positioning body corresponds to the airbag module.

11. The steering device assembly according to claim 1 wherein the first positioning body corresponds to the airbag module and the second positioning body corresponds to the steering device.

12. A method for installing an airbag module on a steering device of a motor vehicle by a steering device assembly, wherein one of two positioning bodies includes a substantially rigid catch hook and another of the two positioning bodies includes an elastic detent element for locking with the catch hook, and wherein the method comprises the following steps:

moving the second positioning body to the first positioning body in an axial assembly direction so as to axially guide the second positioning body on the first positioning body;
having a free leg end of a first leg come into contact with a stop on the second positioning body, thus causing a detent lever to be pivoted from an initial position to final assembly position and, in the final assembly position, to lock with a detent contour of the second positioning body, wherein
the elastic detent element locks with the catch hook before the detent lever reaches final assembly position.

13. A steering device assembly for positioning and fastening an airbag module on a rotatable steering device of a motor vehicle, the steering device comprising:
a first positioning body;
a second positioning body; and
a plurality of detent lever units operatively connected to the first positioning body;
wherein each detent lever unit includes a detent lever, a carrier and a spring element;
wherein each detent lever includes a first leg and a second leg, each of the first and second legs having first leg ends and second free leg ends disposed opposite of the first leg ends; the first and second legs being connected together at the first leg ends of the first and second legs such that the first leg and the second leg extends from the respective first leg ends at a specified angle;
wherein the detent lever is mounted to the carrier for pivoting movement between an initial position and a final assembly position at the respective first leg ends and wherein the carrier is mounted to the first positioning body;
wherein the second positioning body has a plurality of stops formed therein that corresponds to a number of the detent lever units, wherein the stops assist in pivoting each detent lever from the initial position into the final assembly position; and
wherein the second positioning body includes a detent contour that receives the free leg end of the second leg when the detent is in the final assembly position.

14. The steering device assembly of claim 13, wherein the detent contour is configured as a recess on an outside surface of the second positioning body.

15. The steering device assembly of claim 13, wherein the spring element of the detent lever unit is attached to the carrier, and wherein the spring element is deformed when the detent lever pivots between the initial position and the final assembly position, thereby tensioning the spring element.

16. The steering device assembly of claim 15, wherein a detent lever projection is provided on a lateral edge of at least one of the first leg ends, the detent lever projection contacting the spring element and deforming the spring element as the detent lever pivots between the initial position and the final assembly position.

17. The steering device assembly of claim 13, wherein the first positioning body further includes an elastic detent element that selectively engages with at least one catch hook extending from the second positioning body.

18. The steering device of claim 17, further comprising a spring member positioned between a bottom surface of the second positioning body and a top surface of an anchoring component of the first positioning body.

19. The steering device of claim 13, wherein the second positioning body incudes a plurality of guide grooves corresponding to the number of detent lever units, wherein each of the guide grooves are in communication with a stop.

20. A steering device assembly for positioning and fastening an airbag module on a rotatable steering device of a motor vehicle, comprising:
   a first positioning body and a second positioning body, wherein the first positioning body has a detent lever including a first leg and a second leg connected to the first leg,
   a carrier on which the detent lever is mounted for pivoting between an initial position and a final assembly position, and
   a spring element for loading the detent lever into the final assembly position,
   wherein the two legs of the detent lever are connected to each other at one leg end and each leg extends to an opposite free leg end at a specified angle,
   wherein the second positioning body has a stop for the free leg end of the first leg for pivoting the detent lever from the initial position into the final assembly position and a detent contour for locking with the free leg end of the second leg in the final assembly position of the detent lever, and
   wherein the spring element loads the detent lever depending on the pivoting position thereof into the initial position or the final assembly position, whichever is closer.

* * * * *